(12) United States Patent
Dlugosz et al.

(10) Patent No.: US 7,161,779 B2
(45) Date of Patent: Jan. 9, 2007

(54) ANTI-PINCH AND ELECTRICAL MOTOR PROTECTION DEVICE

(75) Inventors: Artur Dlugosz, Sterling Hts, MI (US); Krzysztof Wroblewski, Washington, MI (US)

(73) Assignee: Lear Corporation, Southfield, MI (US)

( * ) Notice: Subject to any disclaimer, the term of this patent is extended or adjusted under 35 U.S.C. 154(b) by 444 days.

(21) Appl. No.: 10/735,361

(22) Filed: Dec. 12, 2003

(65) Prior Publication Data

US 2005/0128660 A1    Jun. 16, 2005

(51) Int. Cl.
*H02H 5/04*    (2006.01)
(52) U.S. Cl. .................................. 361/25
(58) Field of Classification Search ............ 361/25, 361/23
See application file for complete search history.

(56) References Cited

U.S. PATENT DOCUMENTS

| | | | | |
|---|---|---|---|---|
| 3,673,538 A | * | 6/1972 | Faxon ...................... 338/25 |
| 5,153,805 A | * | 10/1992 | Tennant et al. ............. 361/27 |
| 5,394,288 A | * | 2/1995 | Nishida et al. ............ 361/31 |
| 6,404,158 B1 | | 6/2002 | Boisvert et al. ............ 318/469 |
| 6,462,643 B1 | * | 10/2002 | Fujii et al. ................ 338/22 SD |
| 6,548,979 B1 | | 4/2003 | Boisvert et al. ............ 318/469 |
| 2001/0048280 A1 | | 12/2001 | Wilson ..................... 318/445 |
| 2002/0101210 A1 | | 8/2002 | Boisvert et al. ............ 318/469 |
| 2002/0121872 A1 | | 9/2002 | Boisvert et al. ............ 318/469 |
| 2002/0143452 A1 | | 10/2002 | Losey ....................... 701/49 |
| 2002/0190677 A1 | | 12/2002 | Gerbetz ..................... 318/434 |
| 2002/0190680 A1 | | 12/2002 | Gerbetz ..................... 318/445 |
| 2003/0137265 A1 | | 7/2003 | de Frutos ................... 318/468 |
| 2003/0151382 A1 | | 8/2003 | Daniels et al. ............. 318/466 |
| 2004/0114286 A1 | * | 6/2004 | Sullivan et al. ............. 361/25 |

* cited by examiner

*Primary Examiner*—Brian Sircus
*Assistant Examiner*—Boris Benenson
(74) *Attorney, Agent, or Firm*—Bill Panagos

(57) ABSTRACT

An anti-pinch and electric motor protection device includes a positive temperature coefficient circuit protector having a predetermined temperature threshold and is adapted to be in electrical series with a DC circuit to allow current flow in a first direction and in a second opposite direction when the positive temperature coefficient circuit protector is below the threshold and to block current flow in either direction when the positive temperature coefficient circuit protector is above the threshold. A diode electrically in parallel with the positive temperature coefficient circuit protector is adapted to block current flow in one of the directions.

11 Claims, 3 Drawing Sheets

Fig. 5 SYSTEM RESISTANCE VS. TEMPERATURE

ANTI-PINCH AND ELECTRICAL MOTOR PROTECTION DEVICE

FIELD OF INVENTION

This invention relates to an anti-pinch and motor protection device. More specifically, the invention relates to a positive temperature coefficient circuit protector device for use in a motor drive circuit.

BACKGROUND OF INVENTION

In motor vehicles, motor driven devices, such as in windows and seat positioning, are becoming increasingly popular over standard manual devices. Consumers find it much easier and enjoyable to push a button to have the window go up and down or to move a seat into a desired position. Rolling windows down or positioning a seat manually is becoming increasing obsolete. However, these and other motor driven devices like them have been known to become dangerous for users if a body part or some other article gets caught while the motor is activating movement. While an object is caught, there can be a lot of stress on the motors and they may burn out if they become too hot or even just shut off. If this happens, the body part or article caught is still pinched and cannot be released until the motor cools and is reset. This can result in serious damage or injury. The solution to that problem has been to use load sensing devices in line with a motor power output or combined current/speed sensors with sophisticated and expensive software plus motor thermal protection systems. Examples of such devices for motor driven windows include U.S. Patent Application Publication Nos. 2003/0151382 AI, 2003/0137265 AI, 2002/0190680 AI, and 2001/0048280. U.S. Pat. Nos. 6,548,979, 6,404,158 and U.S. Patent Application Publication Nos. 2002/0121872 and 2002/0101210 solve this problem for more devices than just motor driven windows. The devices in these applications solve the problem for door positioning, windows, sliding panels (such as a sunroof), seats, control petals, steering wheel, etc.

While the above listed inventions help move the technology for motor driven devices in motor vehicles forward, they are very costly and make cars more expensive for consumers. Thus, there remains a need in the art for a simple and inexpensive device that prevents possible pinching and damage or injury to an object caught by a motor driven assembly. There further remains a need for a device of this type that also protects the motor from damage in a pinching event.

SUMMARY OF INVENTION

This invention relates to an anti-pinch and electrical motor protection device comprising at least one PTC circuit protector, and a diode. This invention will preferably have two PTC circuit protectors comprising one PTC circuit protector tuned to a low temperature and one PTC circuit protector tuned to a high temperature.

In cases where a body part or an article is caught and thereby putting stress on the motor, the motor will tend to overheat. Once the temperature becomes too high for the PTC circuit protector tuned to a low temperature, the PTC circuit protector is tripped and the electrical current is stopped. The tripped PTC circuit protector may be bypassed in an opposite direction through the diode, which allows for the reversal of the direction of the motor thereby releasing the pinched object and extends the life of the motor.

DETAILED DESCRIPTION OF DRAWINGS

FIG. 5 is a graph of system resistance through the positive temperature coefficient circuit protector device of the present invention versus temperature.

DETAILED DESCRIPTION OF THE PREFERRED EMBODIMENT

Figure 1:
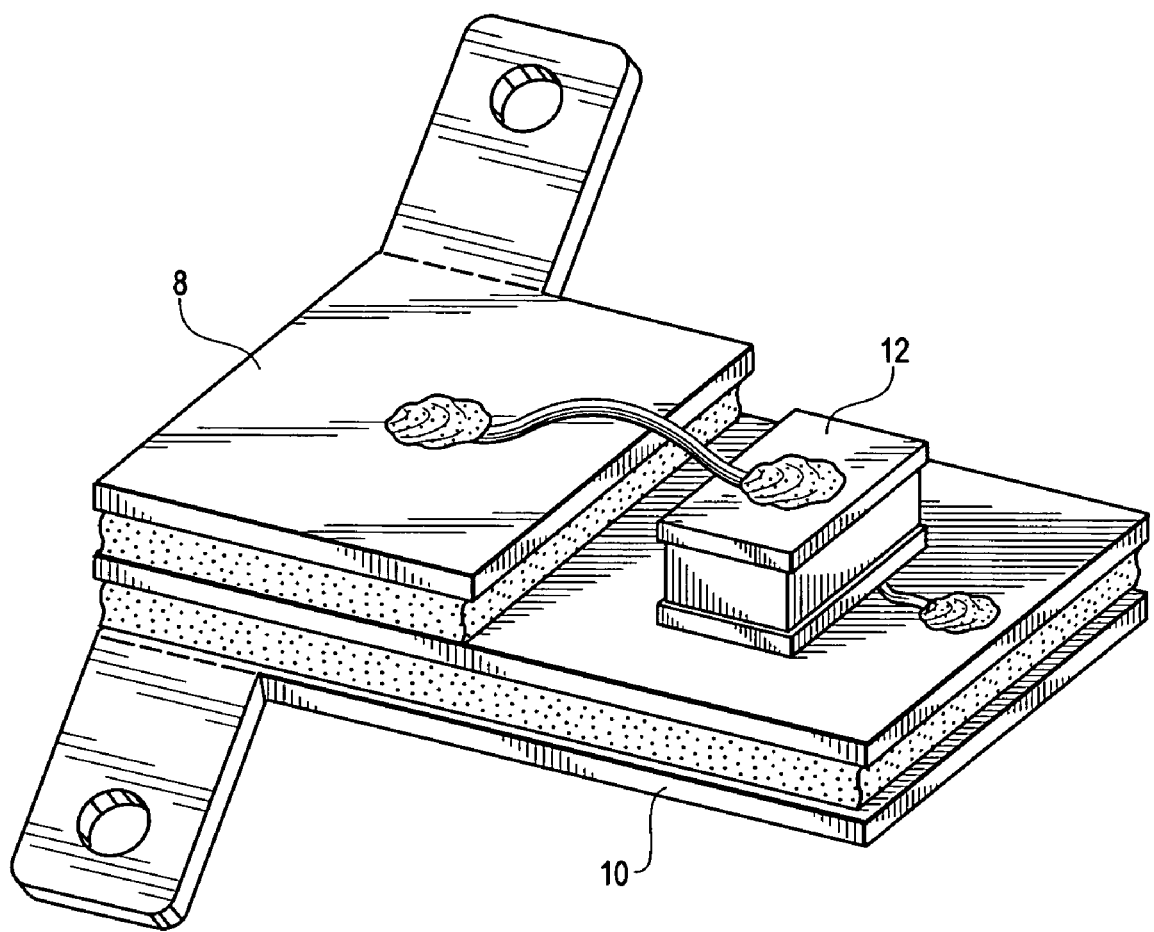
FIG. 1 is a perspective view of the positive temperature coefficient circuit protector device of the present invention.
Figure 2A:
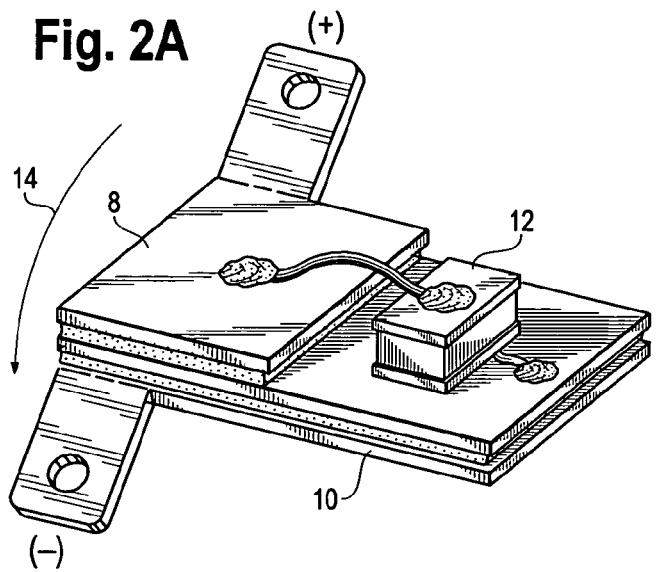
FIG. 2A is a perspective view of the positive temperature coefficient circuit protector device of the present invention in normal mode.
Figure 4:
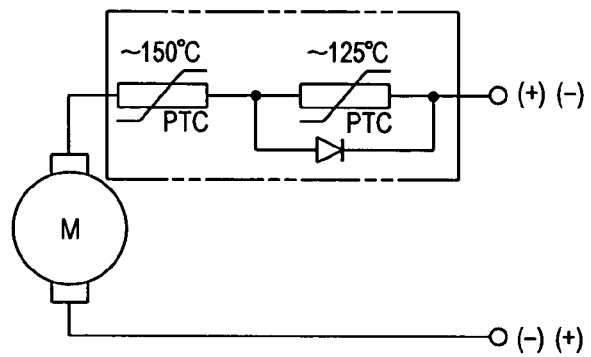
FIG. 4 is a schematic diagram of the positive temperature coefficient circuit protector device of the present invention.
Figure 4:
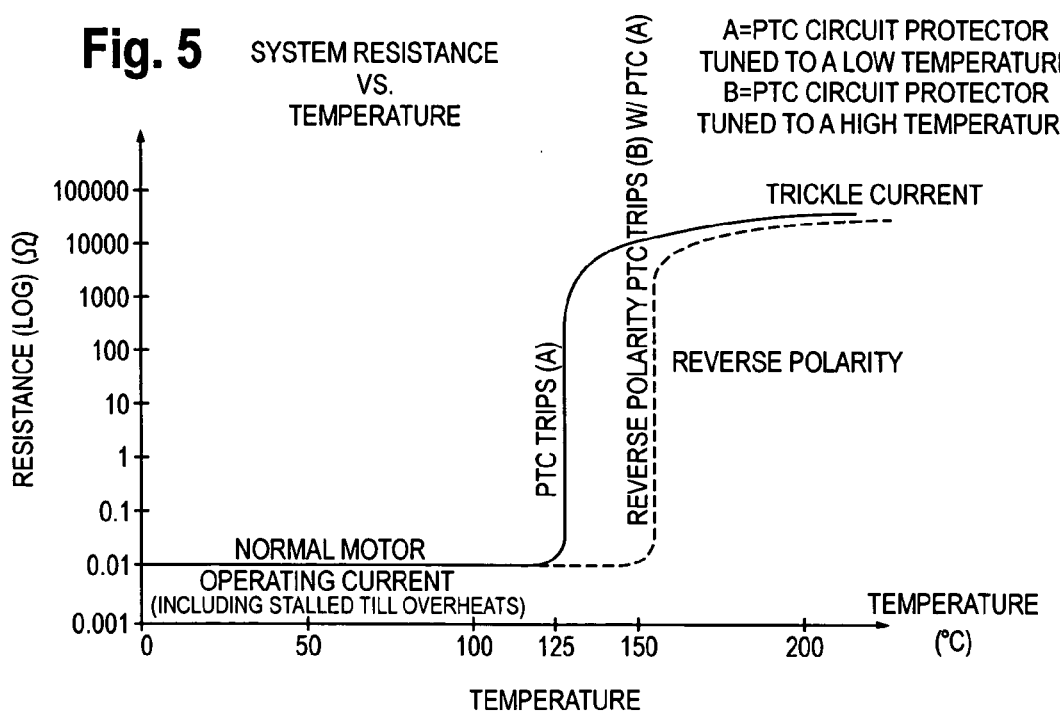

In its preferred embodiment, this invention will be used in motor driven windows, seat, roofs, or any other component of a motor vehicle that utilizes a DC motor. FIG. 2A shows the current flow through positive temperature coefficient (herein after referred to as PTC) circuit protector device of the present invention in its normal mode. In its normal mode, seen in FIG. 2A, the electrical current 14 travels through the PTC circuit protector, indicated at 8, is tuned to a first, or lower temperature, generally around 125 degrees Celsius and through the PTC circuit protector, indicated at 10, is tuned to a second, or higher temperature, generally around 150 C. The tuned temperature of the PTC circuit protector tuned to a lower temperature 8 can be any appropriate temperature as long as there is a difference between the temperature of the PTC circuit protector tuned to a lower temperature 8 and the PTC circuit protector tuned to a higher temperature 10. When the motor is running as it should and there is nothing pinched under the motor driven device, the electrical current has no problem traveling across the PTC circuit protectors 8 and 10. However, in motor driven windows, seats, roof, etc., there is always the risk that an object, a body part, or article of clothing will get pinched. Once that happens, there is high stress on the motor, shown as M in FIG. 4, running that window, seat, or roof. That stress can result in the motor M malfunctioning or even ceasing to function. That can cause severe damage to the motor M and delay getting an object out of its pinched position, resulting in damage or injury.

Figure 2B:
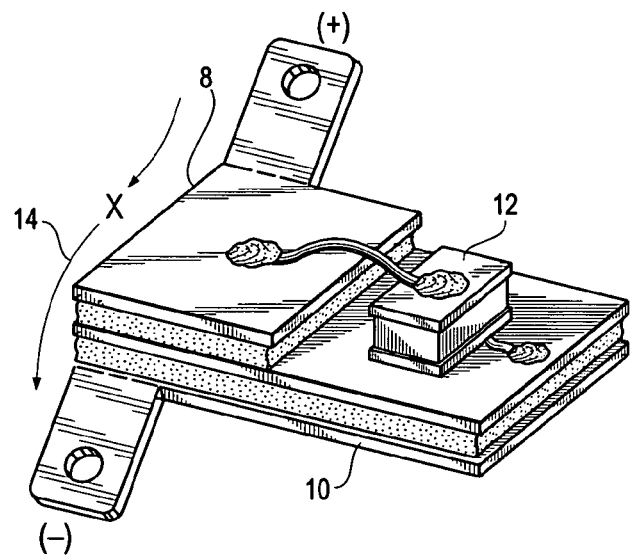
FIG. 2B is a perspective view of the positive temperature coefficient circuit protector device of the present invention indicating a break in the first current flow when the first temperature threshold is exceeded.
Figure 2C:
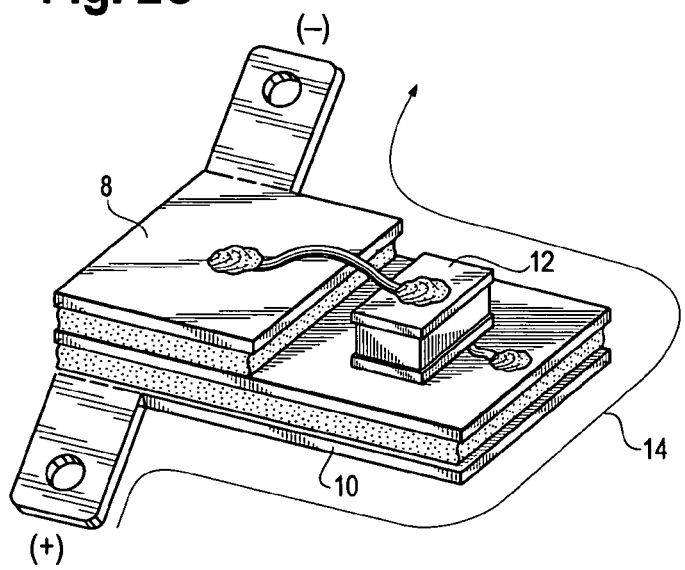
FIG. 2C is a perspective view of the positive temperature coefficient circuit protector device of the present invention indicating the second current flow in the second direction when the first temperature threshold is exceeded.

In the preferred embodiment, if the motor driven device (not shown) pinches something within it, the motor M stalls and begins to draw higher current, which overheats the circuit above the first, or lower temperature to which that the PTC circuit protector 8 is tuned, so that the circuit is tripped, as indicated in FIG. 2B. As shown in FIG. 5, the tripping of the circuit is caused by a logarithmic increase in the resistance of the PTC circuit protector tuned to a first, lower temperature 8 as its tuned temperature is reached. This extreme increase in resistance reduces the current flow to a trickle, effectively stopping the motor M and avoiding damage or injury.

Figure 3:
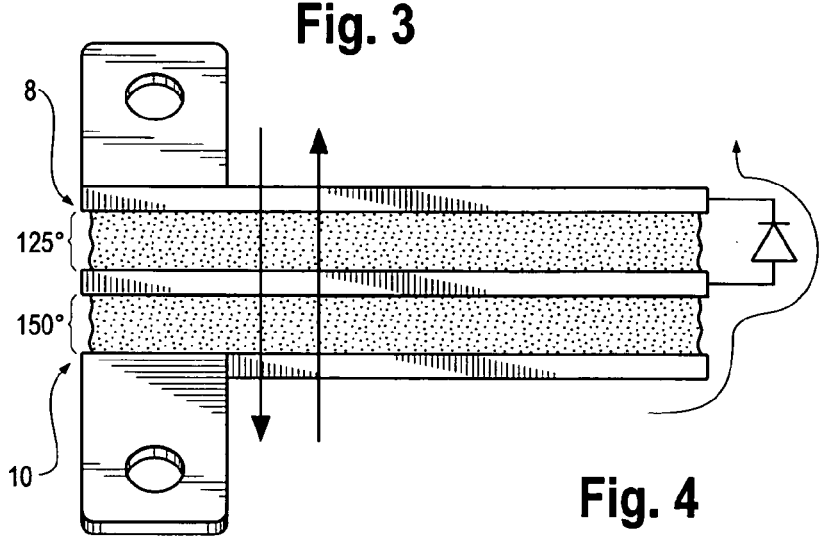
FIG. 3 is a schematic view of the positive temperature coefficient circuit protector device of the present invention indicating the possible paths of current flow.

As shown in FIGS. 1 through 4, to allow a reversing of the motor M, a diode 12 is electrically connected in parallel with the PTC circuit protector tuned to a first, lower temperature 8. The diode 12 is oriented so that the current flow 14 can be reversed, as shown in FIGS. 2C and 3, and flow through the diode 12 around the tripped PTC circuit protector tuned to a first, lower temperature 8, and through the PTC circuit protector tuned to a second, higher temperature 10 to drive the motor M in the opposite direction. The PTC circuit protector tuned to a second, higher temperature 10 continues to protect the motor M in the opposite direction if a problem continues to exist that would cause further overheating of the circuit. This continued capability for reverse motion allows for any object pinched to be released safely and without damage to the motor M and perhaps only minimal damage or injury to the pinched object. Furthermore, the motor cannot run back in the direction of pinching until the circuit and the PTC circuit protector tuned to a first, lower temperature 8 cool down below the tuned temperature.

This invention is very important to any DC driven motors within a motor vehicle because of not only is safety and motor protection features, but also because it is a very easy way to keep down costs of a motor vehicle. This invention is a simplified way of meeting consumer demands for safety and meeting manufacturer's demands for motor protection without using costly software.

The above presents a description of the best mode contemplated for carrying out this invention. The claims should not be read as limited to the described order or elements unless stated to that effect. Therefore, all embodiments that come within the scope and spirit of the following claims and equivalents thereto are claimed as the invention.

What is claimed is:

1. An anti-pinch and electric motor protection device comprising:
    a positive temperature coefficient circuit protector including a first positive temperature coefficient circuit protector with a first predetermined temperature threshold and a second positive temperature coefficient circuit protector having a second predetermined temperature threshold that is higher than said first predetermined temperature threshold of said first positive temperature coefficient circuit protector, said second positive temperature coefficient circuit protector disposed in electrical series with said first positive temperature coefficient circuit protector, said series connected first and said second positive temperature coefficient circuit protectors adapted to allow current flow in a first direction and in a second opposite direction when both said positive temperature coefficient circuit protectors are below said thresholds and to block current flow in either direction when either said positive temperature coefficient circuit protector is above its threshold; and
    a diode in parallel with said positive temperature coefficient circuit protector adapted to block current flow in one of said directions.

2. An anti-pinch and electric motor protection circuit as set forth in claim 1 wherein said first predetermined temperature threshold is chosen to represent a first temperature that is indicative of a first excessive current in said motor caused by a motor stall, and wherein said second predetermined temperature threshold is chosen to represent a second temperature that is indicative of a greater excessive current in said motor caused by a motor stall that is higher than said first predetermined temperature threshold.

3. An anti-pinch and electric motor protection device as set forth in claim 2 wherein said first predetermined temperature threshold is approximately 125 degrees C. and said second predetermined temperature threshold is approximately 150 degrees C.

4. An anti-pinch and electric motor protection circuit comprising:
    a DC motor adapted to accept current flow in a first direction and a second direction so as to operatively rotate said motor in a first angular direction and a second angular direction in response to the application of said first and said second directions of current flow;
    a positive temperature coefficient circuit protector including a first positive temperature coefficient circuit protector with a first predetermined temperature threshold and a second positive temperature coefficient circuit protector having a second predetermined temperature threshold that is higher than said first predetermined temperature threshold of said first positive temperature coefficient circuit protector, said second positive temperature coefficient circuit protector disposed in electrical series with said first positive temperature coefficient circuit protector and adapted to allow current flow in a first direction and in a second opposite direction when said second positive temperature coefficient circuit protector is below said second threshold and to block current flow in either direction when said second positive temperature coefficient circuit protector is above said second threshold; and
    a diode in parallel with said positive temperature coefficient circuit protector adapted to block current flow to said motor in one of said directions.

5. An anti-pinch and electric motor protection circuit as set forth in claim 4 wherein said first predetermined temperature threshold is chosen to represent a first temperature that is indicative of a first excessive current in said motor, and wherein said second predetermined temperature threshold is chosen to represent a second temperature that is indicative of a greater excessive current in said motor that is higher than said first predetermined temperature threshold.

6. An anti-pinch and electric motor protection circuit as set forth in claim 5 wherein said diode orientation in said circuit is adapted to cause all said current in said first current direction to flow through said first positive temperature coefficient circuit protector to drive said motor in said first angular direction with no current flow through said diode, said diode orientation is further adapted to allow current to flow in said second direction after said first predetermined temperature threshold is exceeded so that said motor can be driven in said second angular direction.

7. An anti-pinch and electric motorprotection circuit asset forth in claim 5 wherein said first predetermined temperature threshold is approximately 125 degrees C. and said second predetermined temperature threshold is approximately 150 degrees C.

8. An anti-pinch and electric motor protection circuit comprising:
    a DC motor adapted to accept current flow in a first direction and a second direction so as to operatively rotate in a first angular direction and a second angular direction in response to the application of said first and said second directions of current flow;
    a first positive temperature coefficient circuit protector having a first predetermined temperature threshold;

a second positive temperature coefficient circuit protector having a second predetermined temperature threshold that is higher than said first predetermined temperature threshold of said first positive temperature coefficient circuit protector, said second positive temperature coefficient circuit protector disposed in electrical series with said first positive temperature coefficient circuit protector;

said series connected first and said second positive temperature coefficient circuit protectors adapted to be in electrical communication with said DC motor to allow current flow in a first direction and in a second opposite direction when both said positive temperature coefficient circuit protectors are below said thresholds; and a diode in parallel with said first positive temperature coefficient circuit protector.

9. An anti-pinch and electric motor protection circuit as set forth in claim 8 wherein said first predetermined temperature threshold is chosen to represent a first temperature that is indicative of a first excessive current in said motor, and wherein said second predetermined temperature threshold is chosen to represent a second temperature that is indicative of a greater excessive current in said motor that is higher than said first predetermined temperature threshold.

10. An anti-pinch and electric motor protection circuit as set forth in claim 9 wherein said diode orientation in said circuit is adapted to cause all said current in said first current direction to flow through said first positive temperature coefficient circuit protector to drive said motor in said first angular direction with no current flow through said diode, said diode orientation is further adapted to allow current to flow in said second direction after said first predetermined temperature threshold is exceeded so that said motor can be driven in said second angular direction.

11. An anti-pinch and electric motor protection circuit as set forth in claim 9 wherein said first predetermined temperature threshold is approximately 125 degrees C. and said second predetermined temperature threshold is approximately 150 degrees C.

* * * * *

UNITED STATES PATENT AND TRADEMARK OFFICE
CERTIFICATE OF CORRECTION

PATENT NO. : 7,161,779 B2 Page 1 of 1
APPLICATION NO. : 10/735361
DATED : January 9, 2007
INVENTOR(S) : Dlugosz et al.

It is certified that error appears in the above-identified patent and that said Letters Patent is hereby corrected as shown below:

Column 4, line 54 delete "asset" and insert therefor --as set--.

Signed and Sealed this

Sixteenth Day of September, 2008

JON W. DUDAS
*Director of the United States Patent and Trademark Office*